T. Welch.
Harvester Pitman.
No. 2,868. Reissued Feb. 11, 1868.
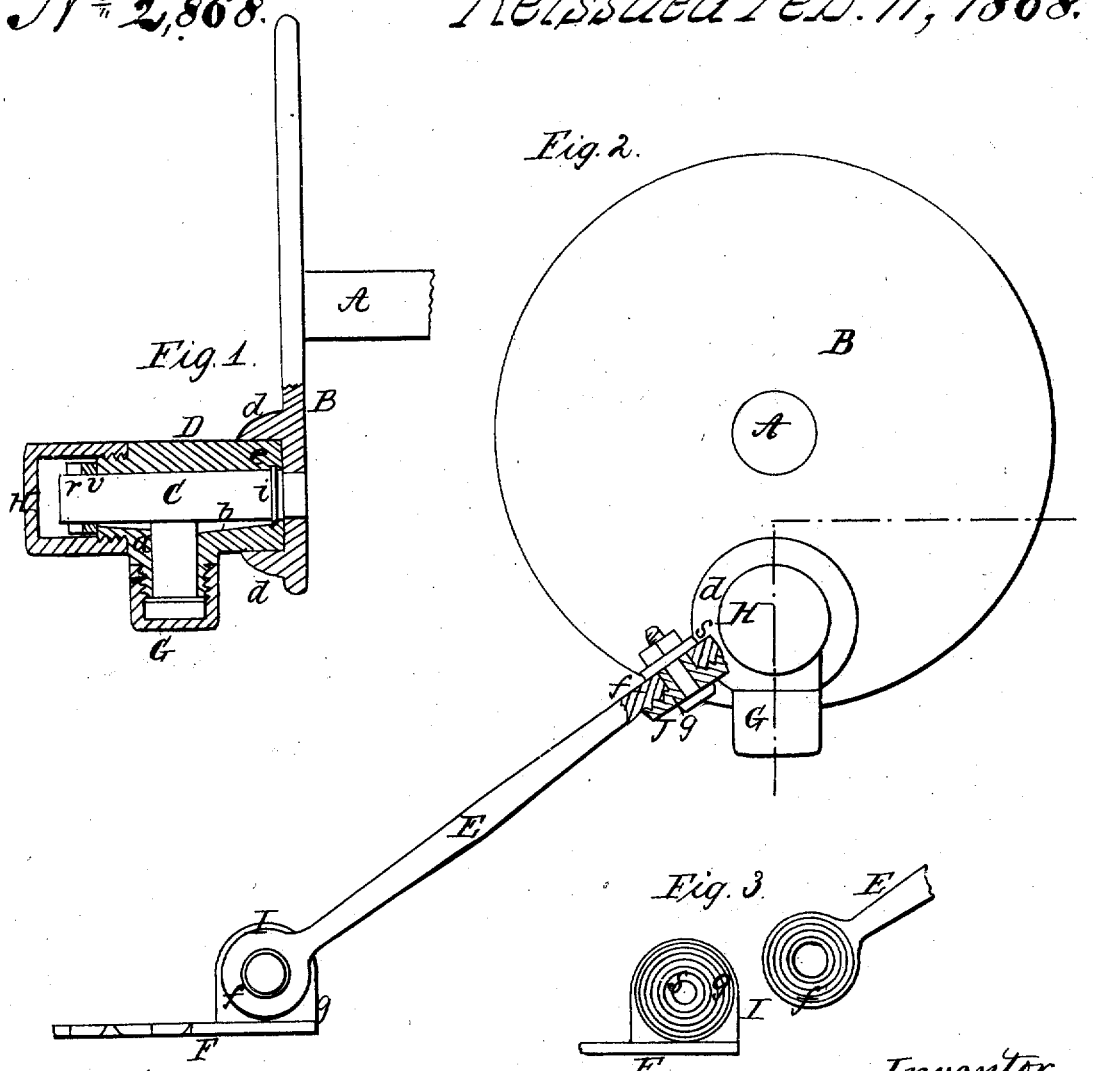
Witnesses,
Wm. S. Loughborough
Asa H. Billings
Inventor
Thomas Welch
N. PETERS, PHOTO-LITHOGRAPHER, WASHINGTON, D. C.

UNITED STATES PATENT OFFICE.

THOMAS WELCH, OF CHURCHVILLE, NEW YORK.

IMPROVEMENT IN CRANK-PINS AND BOXES FOR HARVESTERS.

Specification forming part of Letters Patent No. 49,183, dated August 1, 1865; Reissue No. 2,868, dated February 11, 1868.

*To all whom it may concern:*

Be it known that I, THOMAS WELCH, of Churchville, in the county of Monroe and State of New York, have invented certain new and useful Improvements in Crank-Pin Boxes and Crank-Pins for Reaping and Mowing Machines; and I do hereby declare that the following is a full, clear, and description thereof, reference being had to the accompanying drawings, and to the letters of reference marked thereon, making a part of this specification.

Figure 1 represents a longitudinal section through the box and crank-pin. Fig. 2 is a front elevation of the parts, with the upper serrated joints, J, of the pitman R shown in section. Fig. 3 is a detached face view of the joint-plate of either end of the connecting-rod.

One of the greatest obstacles met with in the operation of reaping and mowing machines is in being unable to prevent the crank-pin and box from "heating and cutting out," and the great cause of that is inefficiency of the means heretofore known or used to lubricate that part of the machine, while it is necessarily run at a high rate of speed, and is constantly exposed to dirt and dust which will settle in the joints.

My invention is intended for and effectually obviates these difficulties, and is provided with a fountain, which, being filled with oil, steadily and constantly allows the pin to be lubricated. This fountain has a suitable screw-cap or an equivalent device, which prevents the leakage of unnecessary oil, and allows the fountain to be filled whenever so desired. The pin is also inclosed in the box in such a manner that oil can circulate around it, and grit and dust cannot enter, nor can any quantity of oil escape therefrom. The connection made between the cutter-bar and pitman is of such a nature that they can be adjusted easily and readily as the parts of the joint become worn by the operation of the machine. The connection of the cutter-bar and pitman commonly known, being formed by opening in the two, with a pin passing through them, is such a one that there is no means by which the wear caused by the friction of the two can be compensated for. By means of the joint employed in my invention it is only requisite to adjust the screw, which passes through or partially through the parts, so as to force the sections together.

In the annexed drawings, A represents a section of the ordinary crank-shaft of a "reaper and mower."

B represents a balance-wheel.

C D represent the crank-pin and box.

E represents the connecting-rod.

F represents an end portion of the knife-bar.

G represents an oil cup or reservoir, and H represents a tight cap over the end of the crank-pin.

The oil-reservoir G may be of any suitable form and secured to the crank-pin box in any suitable position, so as to allow the oil to communicate with the crank-pin C. The tight cap H, being secured or otherwise attached to the end of the box, effectually prevents the escapement of oil at this part and keeps out dirt and grit. The projecting rim *d* of the wheel is provided in part as an additional preventive for the escape of oil, but more especially to prevent the ingress of dust and grit into the joint, also to strengthen the box. I J in Fig. 2 and 3 represent the male and female joints which are used for connecting the pitman to the cutter-bar. These parts are shown more clearly where the connection is made between the pitman and crank-pin box.

It will be understood that the knife-head is provided with a socket, and the pitman is provided with a suitable plate or projection for entering and filling within said socket, or vice versa. The parts of the joint *f g* are made spherical on the one and concave in the other, or are made conical on the one and a corresponding socket in the other, or they may be made to connect together by a "taper pin" to a corresponding socket, all of which are substantially as represented, and accomplish the same ends in substantially the same manner. The main object is to connect the parts described by a joint having a bolt passing into or through them, so that as the operation of the machine wears the parts of the joints they may be readjusted together by tightening the bolt. The mere fact as to whether the "joint and socket" are more or less tapering or rounding, or whether there is an under stud projecting beneath the oval or tapering surface, is immaterial. The bolt which secures the parts of the joint may pass through both of said parts, or may be screwed into the one after having passed through the first. Upon this bolt I provide a washer of any suitable material, and should the bolt not be used to pass through both parts of the joint the washer may or may not be placed under the head thereof. This washer gives a greater bearing-surface to and prevents the bolt from working loose, as well as compressing the joint. Leather, iron, india-rubber, or other similar substances generally used for washers may be applied in this instance.

Having thus fully described my invention, what I claim as new, and desire to secure by Letters Patent, is—

1. The crank-pin box of a harvester with an oil-reservoir, G, for the purpose set forth.

2. A crank-pin box or head, D H, of a harvester, so constructed with reference to the crank-pin C that the outer end of said pin will be enveloped by the head D H, for the purposes set forth.

3. In combination with a crank-pin box provided with an oil-reservoir, a screw-cap, G, or its equivalent, for the purpose of allowing the reservoir to be filled with and prevent the escape of unnecessary oil therefrom.

4. The pitman E and knife-head F, connected by the taper screw-head *g* and socket *f*, or their equivalents, and the bolt which passes into or through the parts, as set forth.

5. In combination with the connecting parts *g f* and bolt, as specified, a washer, in the manner and for the purposes set forth.

THOMAS WELCH.

Witnesses:
C. M. ALEXANDER,
J. M. MASON.